(12) United States Patent
Lim et al.

(10) Patent No.: US 9,654,956 B2
(45) Date of Patent: May 16, 2017

(54) METHOD OF CONTROLLING TRANSMIT POWER AND ELECTRONIC DEVICE THEREFOR

(71) Applicant: Samsung Electronics Co., Ltd., Suwon-si, Gyeonggi-do (KR)

(72) Inventors: Kyung Soo Lim, Yongin-si (KR); Hyuk Kang, Yongin-si (KR); Min Gyew Kim, Seoul (KR); Jae Bong Yoo, Seongnam-si (KR); Jong Ho Choi, Suwon-si (KR); Duk Ki Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/833,745

(22) Filed: Aug. 24, 2015

(65) Prior Publication Data

US 2016/0057599 A1  Feb. 25, 2016

(30) Foreign Application Priority Data

Aug. 25, 2014 (KR) .................. 10-2014-0111072

(51) Int. Cl.
| | |
|---|---|
| *H04W 4/22* | (2009.01) |
| *H04W 52/38* | (2009.01) |
| *H04W 76/02* | (2009.01) |
| *H04W 52/22* | (2009.01) |
| *H04W 52/28* | (2009.01) |
| *H04W 76/00* | (2009.01) |
| *H04W 52/24* | (2009.01) |

(52) U.S. Cl.
CPC ........... *H04W 4/22* (2013.01); *H04W 52/223* (2013.01); *H04W 52/28* (2013.01); *H04W 76/007* (2013.01); *H04W 52/245* (2013.01); *H04W 52/281* (2013.01); *H04W 52/282* (2013.01); *H04W 52/283* (2013.01)

(58) Field of Classification Search
CPC ....... H04W 4/22; H04W 6/007; H04W 88/02; H04W 52/223; H04W 52/245; H04W 52/28; H04W 52/281; H04W 52/282; H04W 52/283
USPC .......................................... 455/404.1, 404.2
See application file for complete search history.

(56) References Cited

U.S. PATENT DOCUMENTS

| | | | | |
|---|---|---|---|---|
| 5,564,075 | A | * | 10/1996 | Gourgue ............. H04W 52/322 455/522 |
| 5,646,606 | A | * | 7/1997 | Wilson .................... H04W 4/22 340/6.1 |
| 5,657,317 | A | * | 8/1997 | Mahany ................ G06F 1/1626 370/311 |

(Continued)

FOREIGN PATENT DOCUMENTS

| | | |
|---|---|---|
| EP | 2 320 685 A1 | 5/2011 |
| WO | 2004/082094 A2 | 9/2004 |

(Continued)

*Primary Examiner* — William Nealon
(74) *Attorney, Agent, or Firm* — Jefferson IP Law, LLP

(57) ABSTRACT

A method for determining a transmit power level in an electronic device and the electronic device thereof are provided. The method includes activating an emergency mode, determining a transmit power level based on a condition, and transmitting an emergency message, including information associated with a request for rescue, with the determined transmit power level.

21 Claims, 10 Drawing Sheets

(56) References Cited

U.S. PATENT DOCUMENTS

| | | | |
|---|---|---|---|
| 7,010,329 B2 | 3/2006 | Livet et al. | |
| 8,886,157 B2 | 11/2014 | Hawkes et al. | |
| 2004/0130446 A1* | 7/2004 | Chen | G08B 25/016 340/539.12 |
| 2004/0180701 A1 | 9/2004 | Livet et al. | |
| 2006/0079268 A1 | 4/2006 | Livet et al. | |
| 2008/0057894 A1* | 3/2008 | Aleksic | H02J 9/002 455/187.1 |
| 2008/0242371 A1* | 10/2008 | Chiba | H04M 1/72536 455/574 |
| 2011/0140913 A1 | 6/2011 | Montenero | |
| 2012/0064855 A1* | 3/2012 | Mendelson | G01C 21/206 455/404.2 |
| 2012/0115430 A1* | 5/2012 | Hawkes | H04M 1/72536 455/404.1 |
| 2012/0238238 A1* | 9/2012 | Galuszka | H04M 1/72541 455/404.2 |
| 2013/0052985 A1* | 2/2013 | Tujkovic | H04W 4/22 455/404.2 |
| 2013/0078942 A1 | 3/2013 | Owens et al. | |
| 2013/0165068 A1* | 6/2013 | Keller | H04M 3/42382 455/404.1 |

FOREIGN PATENT DOCUMENTS

| | | |
|---|---|---|
| WO | 2010/150987 A2 | 12/2010 |
| WO | 2012/064374 A1 | 5/2012 |

\* cited by examiner

METHOD OF CONTROLLING TRANSMIT POWER AND ELECTRONIC DEVICE THEREFOR

CROSS-REFERENCE TO RELATED APPLICATION(S)

This application claims the benefit under 35 U.S.C. §119(a) of a Korean patent application filed on Aug. 25, 2014 in the Korean Intellectual Property Office and assigned Serial number 10-2014-0111072, the entire disclosure of which is hereby incorporated by reference.

TECHNICAL FIELD

The present disclosure relates to a method for adjusting a transmit power level in an electronic device and the electronic device therefor.

BACKGROUND

Currently, as information communication technologies have been developed, network devices, such as base stations, have been installed to support data communication. Electronic devices transmit and receive data with other electronic devices through the network devices, thus making it possible for users to freely use the network devices anywhere.

In addition, electronic devices may transmit and receive data with other electronic devices using base stations, and may transmit and receive data with other electronic devices without using base stations. For example, electronic devices may transmit and receive data with other electronic devices using local area networks, such as a radio frequency identification (RFID) network, a near field communication (NFC) network, and a ZigBee® network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for adjusting a transmit power level of a communication module in an electronic device and the electronic device therefor.

In accordance with an aspect of the present disclosure, a method for determining a transmit power level in an electronic device is provided. The method includes activating an emergency mode, determining a transmit power level based on a condition, and transmitting an emergency message, including information associated with a request for rescue, with the determined transmit power level.

In accordance with another aspect of the present disclosure, an electronic device is provided. The electronic device includes an emergency mode activation module configured to activate an emergency mode, a transmission control module configured to determine a transmit power level based on a condition, and a transmission module configured to transmit an emergency message, including information associated with a request for rescue, with the determined transmit power level.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
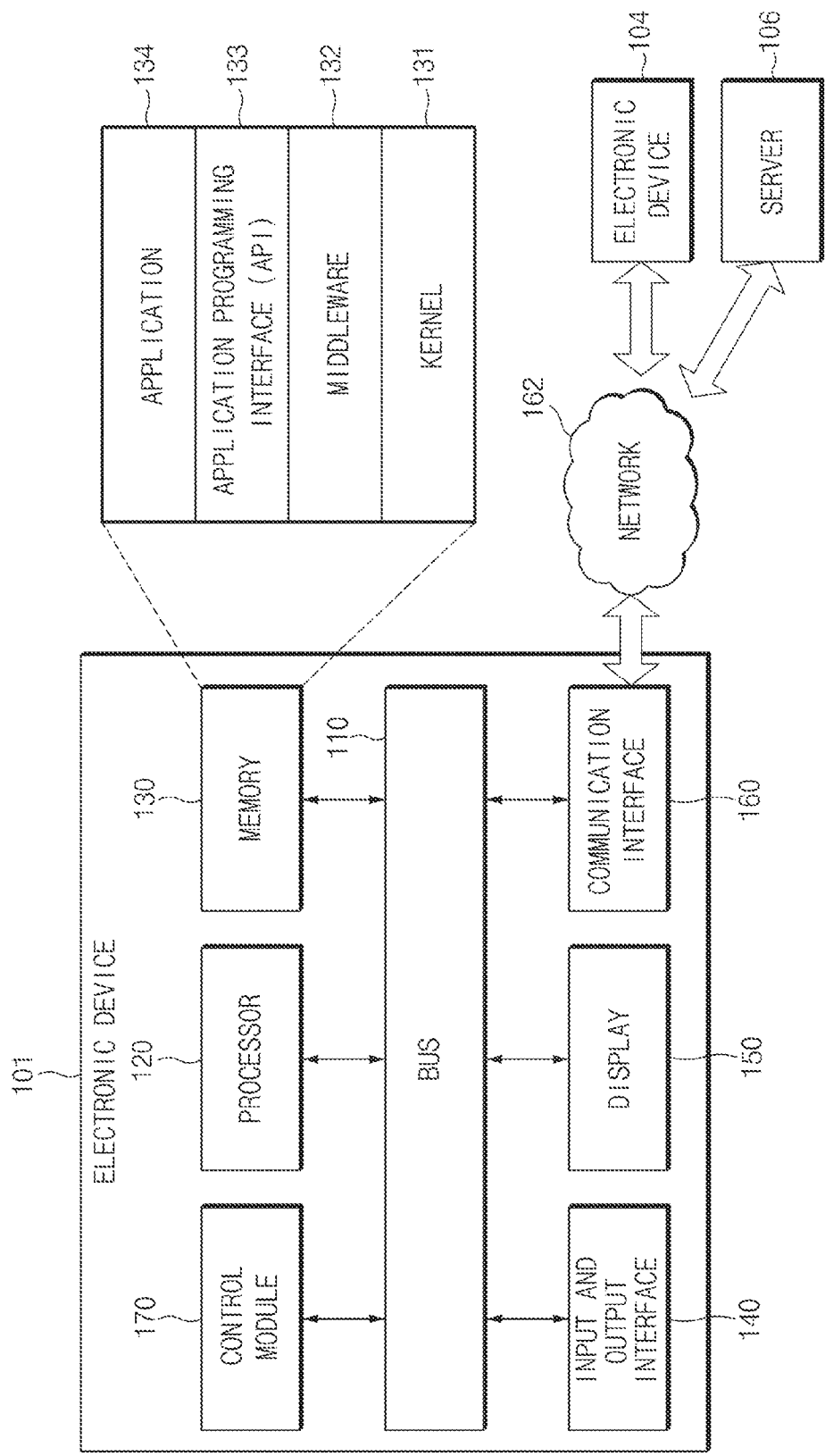
FIG. 1 is a block diagram illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the present disclosure, the expressions "include" and "comprise" or "may include" and "may comprise" used herein indicate existence of disclosed corresponding functions, operations, or elements but does not exclude additional one or more functions, operations, or elements. In addition, it should be further understood that the term "include", "comprise", "have", "including", "comprising", or "having" used herein specifies the presence of stated features, integers, operations, elements, components, or combinations thereof but does not preclude the presence or addition of one or more other features, integers, operations, elements, components, or combinations thereof.

In the present disclosure, the expressions "A or B" or "at least one of A or/and B", and the like, used herein may include any and all combinations of one or more of the associated listed items. For example, the term "A or B" or "at least one of A or/and B" may refer to all of the case (1) where at least one A is included, the case (2) where at least one B is included, or the case (3) where both of at least one A and at least one B are included.

The expressions, such as "1st", "2nd", "first", or "second", and the like, used in various embodiments of the present disclosure may refer to various elements but do not limit the corresponding elements. For example, the expressions do not limit the order and/or priority of the corresponding elements. The expressions may be used to distinguish one element from another element. For instance, both "a first electronic device" and "a second electronic device" indicate electronic devices and different electronic devices. For example, a first component may be referred to as a second component and vice versa without departing from the scope of the present disclosure.

It will be understood that when an element is referred to as being "coupled with/to" or "connected to" another element, the element can be directly coupled with/to or connected to the other element or an intervening element may be present. In contrast, when an element is referred to as being "directly coupled with/to" or "directly connected to" another element, it should be understood that there are no intervening element.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art. Unless expressly so defined herein in various embodiments of the present disclosure, the terms are not in an idealized or overly formal detect.

Electronic devices according to various embodiments of the present disclosure may be devices, each of which controls a transmit power level of each of the electronic devices, which will be described below with reference to FIGS. 1 to 9. For example, electronic devices according to various embodiments of the present disclosure may include at least one of smartphones, smart pads, tablet personal computers (PCs), mobile phones, video telephones, electronic book readers, desktop PCs, laptop PCs, netbook computers, personal digital assistants (PDAs), portable multimedia players (PMPs), Moving Picture Experts Group (MPEG-1 or MPEG-2) audio layer 3 (MP3) players, mobile medical devices, cameras, or wearable devices (e.g., head-mounted-devices (HMDs), such as electronic glasses, an electronic apparel, electronic bracelets, electronic necklaces, electronic appcessories, smart watches, and the like).

According to various embodiments of the present disclosure, the electronic devices may be smart home appliances, each of which controls a transmit power level of each of the electronic devices. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, electronic picture frames.

According to various embodiments of the present disclosure, the electronic devices may include at least one of various medical devices (e.g., a magnetic resonance angiography (MRA), a magnetic resonance imaging (MRI), a computed tomography (CT), scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems for vessels, gyrocompasses, and the like), avionics, security devices, head units for vehicles, industrial or home robots, automatic teller's machines (ATMs), or points of sales (POSs), each of which controls a transmit power level of each of the electronic devices.

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, wave meters, and the like), each of which controls a transmit power level of each of the electronic devices. The electronic devices according to various embodiments of the present disclosure may be one or more combinations of the above-mentioned various devices.

In addition, the electronic devices according to various embodiments of the present disclosure may be flexible electronic devices, each of which controls a transmit power level of each of the electronic devices. In addition, it is obvious to those skilled in the art that electronic devices according to various embodiments of the present disclosure are not limited to the above-mentioned devices.

Hereinafter, electronic devices according to various embodiments of the present disclosure will be described with reference to the accompanying drawings. The term "user" used in various embodiments of the present disclosure may refer to a person who uses an electronic device or may refer to a device (e.g., an artificial electronic device) which uses an electronic device.

FIG. 1 is a block diagram illustrating a network environment including an electronic device according to various embodiments of the present disclosure.

Referring to FIG. 1, an electronic device 101 may include a bus 110, a processor 120, a memory 130, an input and output interface 140, a display 150, a communication interface 160, and a control module 170.

The bus 110 may be a circuit which connects the above-mentioned components with each other and transmits communication (e.g., a control message) between the above-mentioned components.

The processor 120 may receive, for example, an instruction from the above-mentioned other components (e.g., the memory 130, the input and output interface 140, the display 150, the communication interface 160, the control module 170, and the like) through the bus 110, may decode the received instruction, and may perform calculation or data processing according to the decoded instruction.

According to various embodiments of the present disclosure, the processor 120 may activate an emergency mode indicating that a user of the electronic device 101 is in an emergency. For example, the processor 120 may activate the emergency mode by an instruction or request of the input and output interface 140 which receives a user input, for requesting to activate the emergency mode, from the user. In addition, the processor 120 may activate the emergency mode by an instruction or request of the communication interface which receives a message, for informing an emergency, from the outside.

The memory 130 may store instructions or data which are received from the processor 120 or other components (e.g., the input and output interface 140, the display 150, the communication interface 160, the control module 170, and the like) or are generated by the processor 120 or the other components. The memory 130 may include, for example, programming modules, such as a kernel 131, a middleware 132, an application programming interface (API) 133, or an application 134. Each of the above-mentioned programming modules may be configured with software, firmware, hardware, or at least two or more combinations thereof.

The kernel 141 may control or manage system resources (e.g., the bus 110, the processor 120, the memory 130, and the like) used to execute an operation or function implemented in the other programming modules, for example, the middleware 132, the API 133, or the application 134. In addition, the kernel 131 may provide an interface in which the middleware 132, the API 133, or the application 134 may access a separate component of the electronic device 101 and may control or manage the separate component.

The middleware 132 may play a role as a go-between such that the API 133 or the application 134 communicates with the kernel 131 and transmits and receives data. In addition, the middleware 132 may perform control (e.g., scheduling or load balancing) with respect to work requests using a method of assigning priority which may use system resources (the bus 110, the processor 120, or the memory 130, and the like) of the electronic device 101 to, for example, at least one of the application 134, in connection with the work requests received from the application 134.

The API 133 may be an interface in which the application 134 controls a function provided from the kernel 131 or the middleware 132. For example, the API 133 may include at least one interface or function (e.g., an instruction) for file control, window control, image processing, text control, and the like.

According to various embodiments of the present disclosure, the application 134 may include a short message service (SMS)/multimedia message service (MMS) application, an e-mail application, a calendar application, an alarm application, a health care application (e.g., an application for measuring quantity of exercise or blood sugar, and the like), an environment information application (e.g., an application for providing atmospheric pressure information, humidity information, or temperature information), and the like. Additionally or alternatively, the application 134 may be an application associated with exchanging information between the electronic device 101 and an external electronic device (e.g., another electronic device 104). The application associated with exchanging the information may include, for example, a notification relay application for transmitting specific information to the external electronic device or a device management application for managing the external electronic device.

For example, the notification relay application may include a function of transmitting notification information, which are generated by other applications (e.g., the SMS/MMS application, the e-mail application, the health care application, the environment information application, and the like) of the electronic device 101, to the external electronic device (e.g., the other electronic device 104). Additionally or alternatively, the notification relay application may receive notification information from, for example, the external electronic device (e.g., the other electronic device 104), and may provide the received notification information to a user of the electronic device 101. For example, the device management application may manage (e.g., install, delete, or update) a function (e.g., a function of turning on/off the external electronic device itself (or partial components) or a function of adjusting brightness (or resolution) of the display 150) for at least a part of the external electronic device (e.g., the other electronic device 104) which communicates with the electronic device 101, an application which operates in the external electronic device, or a service (e.g., a call service or a message service) provided from the external electronic device.

According to various embodiments of the present disclosure, the application 134 may include an application specified according to attributes (e.g., a kind of the electronic device) of the external electronic device (e.g., the other electronic device 104). For example, when the external electronic device is an MP3 player, the application 134 may include an application associated with playing music. Similarly, when the external electronic device is a mobile medical device, the application 134 may include an application associated with health care. According to an embodiment of the present disclosure, the application 134 may include at least one of an application specified in the electronic device 101 and an application received from the external electronic device (e.g., a server 106 or the other electronic device 104).

The input and output interface 140 may transmit instructions or data input from the user through an input and output device (e.g., a sensor, a keyboard, a touch screen, and the like) to, for example, the processor 120, the memory 130, the communication interface 160, or the control module 170 through the bus 110. For example, the input and output interface 140 may provide data for a touch of the user, which is input through the touch screen, to the processor 120. In addition, the input and output interface 140 may output instructions or data received from, for example, the processor 120, the memory 130, the communication interface 160, or the control module 170 through the bus 110 through the input and output device (e.g., a speaker or the display 150).

For example, the input and output interface 140 may output voice data processed through the processor 120 to the user through the speaker.

The display 150 may display a variety of information (e.g., multimedia data or text data, and the like) to the user.

The communication interface 160 may establish communication between the electronic device 101 and the external electronic device (e.g., the other electronic device 104 or the server 106). For example, the communication interface 160 may connect to a network 162 through wireless communication or wired communication and may communicate with the external electronic device. The wireless communication may include at least one of, for example, Wi-Fi, Bluetooth (BT), BT low energy (BLE), near field communication (NFC), a GPS, or cellular communication (e.g., 3rd generation (3G), long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), and the like). The wired communication may include at least one of, for example, a universal serial bus (USB), a high definition multimedia interface (HDMI), a recommended standard 232 (RS-232), a plain old telephone service (POTS), and the like.

According to an embodiment of the present disclosure, the network 162 may include a telecommunications network. The telecommunications network may include at least one of a computer network, the Internet, the Internet of things, a telephone network, and the like. According to an embodiment of the present disclosure, a protocol (e.g., a transport layer protocol, a data link layer protocol, or a physical layer protocol) for communication between the electronic device 101 and the external electronic device may be supported in at least one of the application 134, the API 133, the middleware 132, the kernel 131, or the communication interface 160.

According to various embodiments of the present disclosure, the communication interface 160 may receive a message, for informing an emergency, from the external electronic device (e.g., the server 106).

In addition, the communication interface 160 may transmit an emergency message, for providing notification that the user of the electronic device 101 is in an emergency, to the external electronic device (e.g., the other electronic device 104). The transmission of the emergency message may be performed when it is determined that the processor 120 activates an emergency mode.

The control module 170 may process at least some of information obtained from other components (e.g., the processor 120, the memory 130, the input and output interface 140, the display 150, the communication interface 160, and the like) and may provide the processed information to the user in various ways.

For example, the control module 170 may control a transmit power level, for transmitting the emergency message, using the processor 120 or to be independent of the processor 120.

According to various embodiments of the present disclosure, when an emergency mode is activated, the control module 170 may control a transmit power level for transmitting an emergency message in the communication interface 160. The transmit power level of the communication interface 160 may be determined according to predetermined conditions, for example, duration of the emergency mode, the currently remaining capacity of a battery of the electronic device 101, a transmission period of the emergency message, a transmission range of the emergency message, and the like.

According to an embodiment of the present disclosure, the server 106 may support driving of the electronic device 101 by performing at least one of operations (or functions) implemented in the electronic device 101. For example, the server 106 may include at least one or more modules which may support the control module 170 implemented in the electronic device 101. For example, the server 106 may receive a battery state of the electronic device 101 or information about power consumption of operating configurations (e.g., a sensor, a processor, and the like), may calculate a transmit power level suitable for the electronic device 101, and may notify the electronic device 101 of the calculated transmit power level.

Various embodiments of the present disclosure may be applied when a user of an electronic device is in an emergency. For example, the user of the electronic device may be in an emergency, such as staying on an uninhabited island, being located in a place where an earthquake occurs, or being trapped in a collapsed building. In addition, the user of the electronic device may be abducted by an abductor.

Since a communication rate of a cellular network may be bad under the above-described circumstances, a battery of the electronic device may be quickly exhausted. Therefore, there is a need for the electronic device to transmit an emergency message to the outside without using the cellular network. For example, the electronic device may broadcast the emergency message to the outside using BLE.

It may be predicted that it will be a long time to overcome the above-mentioned circumstances. There is a need for the electronic device to adjust a transmit power level to transmit an emergency message for a long time. In this case, the electronic device should be able to transmit the emergency message to a position where another electronic device may be present. The electronic device may adjust a transmit power level based on the position.

Figure 2:
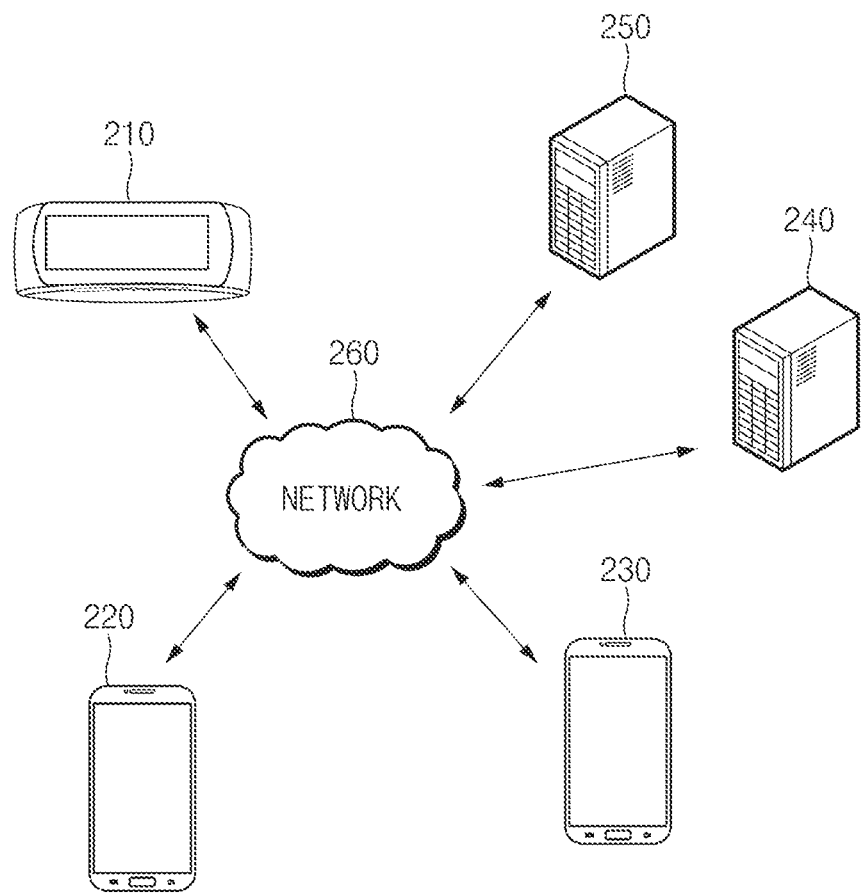
FIG. 2 illustrates a configuration of a system for determining a transmit power level according to various embodiments of the present disclosure.

FIG. 2 illustrates a configuration of a system for determining a transmit power level according to various embodiments of the present disclosure.

Referring to FIG. 2, the system for determining the transmit power level may include a first electronic device 210, a second electronic device 220, a third electronic device 230, a first server 240, a second server 250, and a network 260. Herein, since this system of FIG. 2 is at least one of various embodiments of the present disclosure, the present disclosure is not limited thereto through FIG. 2.

The first electronic device 210 may support an emergency mode. The emergency mode may be activated in various ways. For example, the first electronic device 210 may activate the emergency mode according to a user input received from a user.

The first electronic device 210 may be a wearable device which may be worn by the user. Accordingly, bio-information of the user may be measured by various sensors included in the first electronic device 210. The first electronic device 210 may also activate the emergency mode according to the measured bio-information of the user, for example, a heart rate or blood oxygen saturation (saturation of peripheral oxygen ($SpO_2$)), and the like.

In addition, the first electronic device 210 may receive disaster information from the first server 240, for example, a server of a disaster management center and may activate an emergency mode according to the received disaster information.

The first electronic device 210 may be paired with another electronic device (e.g., the other electronic device 104 shown in FIG. 1) through local area communication, for example, BT, and the like. Therefore, the first electronic device 210 may directly receive the disaster information from the first server 240 and may also receive the disaster information from the other electronic device 104 paired with the first electronic device 210.

The first electronic device 210 may transmit an emergency message to the outside according to the activation of the emergency mode. In this case, the first electronic device 210 may determine a transmit power level of the emergency message based on a predetermined condition. The first electronic device 210 may transmit the emergency message to the outside according to the determined transmit power level.

For example, the first electronic device 210 may set duration of the emergency mode. In addition, the first electronic device 210 may determine a transmit power level of the emergency message according to the set duration of the emergency mode. For example, the first electronic device 210 may determine a level of power for transmitting the emergency message such that the first electronic device 210 is not powered off during the at least duration of the emergency mode.

In addition, the first electronic device 210 may determine a transmit power level of the emergency message based on the currently remaining capacity of its battery, a transmission period of the emergency message, a transmission range of the emergency message, and the like.

The first electronic device 210 may designate the second electronic device 220 as a target and may transmit the emergency message to the designated second electronic device 220. In contrast, the first electronic device 210 may broadcast the emergency message around the first electronic device 210 without designating a target. In this case, the second electronic device 220 which is close to the first electronic device 210 may receive the emergency message. In addition, the emergency message may broadcast in a BLE scheme.

The second electronic device 220 may transmit an acknowledgement message to the received emergency message to the first electronic device 210. The first electronic device 210 may receive the acknowledgement message and may transmit state information about the first electronic device 210 or the user to the second electronic device 220.

The second electronic device 220 may perform a predetermined operation according to the received emergency message or the received state information. For example, the second electronic device 220 may transmit at least some of the emergency message or the state information to the outside. For example, the second electronic device 220 may transmit necessary information or may connect a call to the third electronic device 230, for example, electronic devices of the police station, the fire station, the emergency room, and the like. Alternatively, the second electronic device 220 may transmit the necessary information to the second server 250, for example, servers of the emergency center, and the like.

The predetermined operation may be an operation which is set in the second electronic device 220 and may also be an operation of an instruction and the like which are included in the received emergency message or state information. For example, when a contact number to be contacted in an emergency is preset in the emergency message, the second electronic device 220 may transmit a message or may connect a call to the corresponding contact number using the predetermined operation. The message may include information, for example, a heart rate, blood oxygen saturation, a blood type, and a medical history of a user. The information may be included in the received emergency message or the received state information. In addition, the second electronic device 220 may transmit its position information together with at least some of the emergency message or the state information to the outside.

As described above, the description is given of the example in which the first electronic device 210 broadcasts the emergency message, receives the acknowledgement message from the second electronic device 220, and transmits the state information to the second electronic device 220 again. Herein, according to various embodiments of the present disclosure, the first electronic device 210 may broadcast the emergency message and the state information together. In this case, the second electronic device 220 may receive at least one of the emergency message or the state information and may immediately communicate with the third electronic device 230 or the second server 250.

Hereinafter, a description will be given of making a comparison between when the emergency message and the state information broadcast together (a first scenario) and when only the emergency message broadcasts (a second scenario).

In case of the first scenario, the second electronic device 220 may receive state information, such as a heart rate and $SpO_2$, may determine a state of a user accurately, and may more quickly handle an emergency. Herein, since the emergency message and the state information continuously broadcast when an electronic device (e.g., the second electronic device 220) which will receive the emergency message and the state information is not close to the first electronic device 210, the first scenario may have the more amount of battery consumption than that of the second scenario. In contrast, in case of the second scenario, the second electronic device 220 may not quickly handle an emergency and may have an advantage in view of battery consumption of the first electronic device 210. Therefore, according to various embodiments of the present disclosure, each of the first and second scenarios may be selected in a different way according to the remaining capacity of a battery of the first electronic device 210. For example, when the remaining capacity of the battery of the first electronic device 210 is greater than or equal to a predetermined value, the first scenario may be selected. When the remaining capacity of the battery of the first electronic device 210 is less than the predetermined value, the second scenario may be selected.

The network 260 (e.g., the network 162 shown in FIG. 1) may connect to each of the first electronic device 210, the second electronic device 220, the third electronic device 230, the first server 240, and the second server 250, which are included in the system for determining the transmit power level. In this case, the network 260 may refer to a connection structure which may exchange information between nodes, such as electronic devices and servers. As described above, this network 260 may include, but is not limited to, Wi-Fi, BT, BLE, NFC, a GPS, or cellular communication (e.g., 3G, LTE, LTE-A, CDMA, WCDMA, UMTS, WiBro, or GSM, and the like).

A service for determining a transmit power level may be provided through an application installed in the first electronic device 210. Herein, the application may refer to an application program. For example, the application may include an app executed in the first electronic device 210.

Figure 3A:
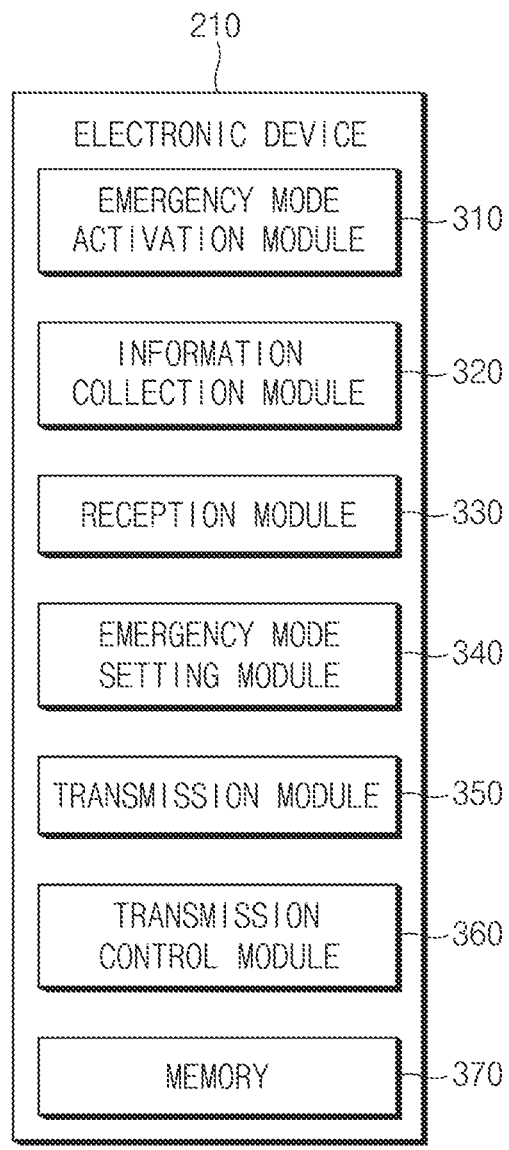
FIG. 3A is a block diagram illustrating a configuration of an electronic device according to various embodiments of the present disclosure.

FIG. 3A is a block diagram illustrating a configuration of an electronic device according to various embodiments of the present disclosure.

Referring to FIG. 3A, a first electronic device 210 may include an emergency mode activation module 310, an information collection module 320, a reception module 330, an emergency mode setting module 340, a transmission module 350, a transmission control module 360, and a memory 370. Herein, the first electronic device 210 shown in FIG. 3A is only at least one or more of various implementation examples of the present disclosure. Various modifications of the first electronic device 210 are possible according to the components shown in FIG. 3A.

For example, the first electronic device 210 may further include a user interface for receiving any instruction or information from a user, for example, a user input. In this case, in general, the user interface may be an input device, such as a keyboard and a mouse. In addition, the user interface may be a graphical user interface (GUI) displayed on an image display device.

The emergency mode activation module 310 may determine whether to activate an emergency mode. For example, the emergency mode activation module 310 may activate the emergency mode according to a user input for requesting to activate the emergency mode. The emergency mode may be, for example, a mode of controlling the amount of power consumed by the first electronic device 210 and transmitting an emergency message to the outside when it is estimated that the user is in an emergency mode.

The user input for requesting to activate the emergency mode may be to click a physical button included in the first electronic device 210 and to touch and select a specific icon displayed on a screen of the first electronic device 210. In addition, the user input for requesting to activate the emergency mode may be a predetermined gesture, for example, an operation of swing the first electronic device 210 a predetermined number of times, and the like.

A processor (e.g., a processor 120 shown in FIG. 1) of the first electronic device 210 may inactivate at least a part of functions of the first electronic device 210 according to the activation of the emergency mode. For example, the processor may inactivate a cellular communication function or a display function.

The information collection module 320 may collect state information obtained by at least one or more sensors included in the first electronic device 210 with respect to the first electronic device 210 or a user of the first electronic device 210.

The state information may include position information of the first electronic device 210. In addition, the state information may include motion information including position change information and acceleration change information of the first electronic device 210. The motion information may allow the first electronic device 210 to determine that the user is walking, running, driving, and the like.

In addition, the state information may include information about time when the emergency mode is activated. In addition, the state information may include bio-information including a heart rate and $SpO_2$ of the user.

According to various embodiments of the present disclosure, at least one or more information included in the state information may allow the emergency mode activation module 310 to activate the emergency mode of the first electronic device 210. For example, when there is a disorder in a heart rate or $SpO_2$ of the user, the emergency mode activation module 310 may activate the emergency mode. In addition, when there is a sudden change in altitude of the first electronic device 210 or a change in acceleration on a Z axis, the emergency mode activation module 310 may determine that the user is in an emergency, such as a fall, and may activate the emergency mode.

According to various embodiments of the present disclosure, after the emergency mode is activated, the information collection module 320 may collect state information about the first electronic device 210 or the user of the first electronic device 210.

The reception module 330 may receive a message, for informing an emergency, such as disaster information, from the outside. For example, the reception module 330 may receive the disaster information message from a first server 240 or another electronic device shown in FIG. 2. According to various embodiments of the present disclosure, the received message for informing the emergency may allow the emergency mode activation module 310 to activate the emergency mode of the first electronic device 210. For example, when the reception module 320 receives a message, such as an earthquake warning or a typhoon warning, from a server of a disaster management center, the emergency mode activation module 310 may activate the emergency mode of the first electronic device 210 according to the received message.

According to an embodiment of the present disclosure, another electronic device paired with the first electronic device 210 may receive a message, such as an earthquake warning or a typhoon warning, from the server of the disaster management center. In this case, the reception module 330 may receive the message, for informing the earthquake warning or the typhoon warning, from the other electronic device. The emergency mode activation module 310 may activate the emergency mode of the first electronic device 210 according to the received message.

The first electronic device 210 may generate an emergency message, including information associated with a request for rescue, according to the activation of the emergency mode. In addition, a processor of the first electronic device 210 may transmit the emergency message to the outside through the transmission module 350. In this case, the reception module 330 may receive an acknowledgement message to the transmitted emergency message from the second electronic device 220. The acknowledgement message may be, for example, a message for requesting to generate a session.

The processor of the first electronic device 210 may display the acknowledgement message on a screen of the first electronic device 210 to inform the user of the received acknowledgement message. Alternatively, the processor may activate a vibration motor of the first electronic device 210 to inform the user of receiving the acknowledgement message.

In addition, the processor (e.g., the processor 120 shown in FIG. 1) of the first electronic device 210 may generate a session with a second electronic device 220 of FIG. 2 according to the session generation request message. Thereafter, the first electronic device 210 may communicate with the second electronic device 220 in a unicasting scheme through the generated session. In addition, the processor may end the transmission of the emergency message or may adjust a transmit power level, according to the session generation request message. The operation of adjusting the transmit power level may be to reduce the amount of a battery resumed by the first electronic device 210.

The emergency mode setting module 340 may set various options for the emergency mode activated by the emergency mode activation module 310. For example, the emergency mode setting module 340 may set duration for the emergency mode. The duration may be previously stored as a default setting in the memory 370. The set duration may be a predetermined period (e.g., 10 days) when people may survive in an emergency. Herein, the duration may be changed according to user settings.

The transmission module 350 may transmit the emergency message to the outside. For example, the transmission module 350 may transmit the emergency message to the outside in a broadcasting scheme. In this case, another electronic device which is within a range where the emergency message broadcasts, for example, the second electronic device 220 may receive the emergency message. In addition, the transmission module 350 may correspond to BLE communication. The emergency message may broadcast around the first electronic device 210 through the BLE communication.

The transmission module 350 may transmit the emergency message to the outside continuously during the emergency mode duration set by the emergency mode setting module 340. In addition, the transmission module 350 may transmit position information (e.g., information which may be obtained through a GPS or a Wi-Fi positioning system (WPS), and the like) of the first electronic device 210 together with the emergency message to the outside.

According to various embodiments of the present disclosure, the emergency message may include information of the first electronic device 210 or user information of the first electronic device 210. For example, the information of the first electronic device 210 may include a phone number, identification information, and the like. In addition, the user information of the first electronic device 210 may include previously input information about a name, a phone number, a blood type, and a medical history of the user.

In addition, the transmission module 350 may transmit the state information collected by the information collection module 320 to the second electronic device 220. The transmission module 350 may transmit the state information, as a response to the acknowledgement message received from the second electronic device 220, to the second electronic device 220. As described above, the transmission module 350 may transmit the state information to the second electronic device 220 in a unicasting scheme through the session generated by the processor.

As described above, the state information may be collected after the emergency mode is activated. For example, the state information may be collected by the information collection module 320 after the reception module 330 receives the acknowledgement message from the second electronic device 220 and may be transmitted to the second electronic device 220.

The transmission control module 360 may set a transmission period of the emergency message or the number of times the emergency message is transmitted. For example, the transmission control module 360 may set the transmission period of the emergency message such that the emergency message is transmitted per 30 minutes. Alternatively, the transmission control module 360 may set the number of times the emergency message is transmitted such that the emergency message is transmitted a total of 30 times. According to various embodiments of the present disclosure, the transmission control module 360 may set both of the transmission period of the emergency message and the number of times the emergency message is transmitted. When duration of the emergency mode is set, the transmission control module 360 may achieve a desired purpose by setting one of the transmission period of the emergency message and the number of times the emergency message is transmitted to correspond to the duration. For example, when the duration of the emergency mode is 10 days and when the transmission period of the emergency message is 1 minutes, the number of times the emergency message is transmitted may be 60 times (/one hour)*24 hours*10 days, that is, 14,400 times.

The transmission period of the emergency message or the number of times the emergency message is transmitted may be set according to a user input. In addition, the transmission period of the emergency message or the number of times the emergency message is transmitted may be set according to the remaining capacity of the battery of the first electronic device 210 without a user input.

According to various embodiments of the present disclosure, the information collection module 320 may periodically collect state information about the first electronic device 210 or the user. In this case, the transmission control module 360 may determine a transmission period of the emergency message not to be overlapped with a period when the information collection module 320 measures bio-information of the user. For example, the transmission control module 360 may prevent the emergency message from being transmitted while the information collection module 320 measures a heart rate, $SpO_2$, or a temperature of the user. When a memory or a central processing unit (CPU) has low performance and when a plurality of operations are simultaneously performed, one operation may be influenced. When an overload occurs since the operations are simultaneously performed, much power may be consumed.

The transmission control module 360 may determine a transmit power level for the emergency message based on a transmission range of the emergency message. When the transmit power level is more increased, the emergency message may become farther broadcast.

In addition, the transmission control module 360 may determine a transmit power level for the emergency message based on the remaining capacity of the battery of the first electronic device 210 or a level of power consumed by a function activated by the first electronic device 210.

The transmission control module 360 may determine a transmit power level of the transmission module 350 based on various factors. For example, the transmission control module 360 may determine a real transmit power level according to one or more of a predicted transmit power level, duration of the emergency mode set by the emergency mode setting module 340, and the remaining capacity of the battery of the first electronic device 210.

According to various embodiments of the present disclosure, the transmission control module 360 may predict a predicted transmit power level according to a predetermined standard and may determine the real transmit power level based on the predicted transmit power level, the duration of the emergency mode, and the remaining capacity of the battery of the first electronic device 210. For example, the transmission control module 360 may predict a predicted transmit power level according to predetermined duration of the emergency mode, as a default setting, and the remaining capacity of the battery of the first electronic device 210. Therefore, when duration of an emergency mode set by the user is shorter than the predetermined duration, the transmission control module 360 may set a real transmit power level to be higher than a predicted transmit power level. In contrast, when the duration of the emergency mode set by the user is longer than the predetermined duration, the transmission control module 360 may set the real transmit power level to be lower than the predicted transmit power level.

Herein, according to various embodiments of the present disclosure, the transmission control module 360 may predict the predicted transmit power level or may determine the real transmit power level based on many elements as well as the duration of the emergency mode and the remaining capacity of the battery.

For example, the transmission control module 360 may predict the predicted transmit power level or may determine the real transmit power level according to the set transmission period of the emergency message or the set number of times the emergency message is transmitted.

In addition, the transmission control module 360 may predict the predicted transmit power level or may determine the real transmit power level based on power consumed by various components, for example, an application processor (AP), various types of sensors, a screen, and the like, which are included in the first electronic device 210.

In addition, the transmission control module 360 may determine a transmit power level of the transmission module 350 according to the state information. For example, when a heart rate of the user is weakened, the transmission control module 360 may adjust predetermined duration of the emergency mode, as a default setting, and may maximize the transmit power level.

According to various embodiments of the present disclosure, the emergency message may not be transmitted always with a transmit power of the same level. For example, the emergency message may be transmitted by alternately consuming a transmit power of a high level and a transmit power of a low level, for example, by a strong-weak-strong-weak-strong-weak pattern. Alternatively, the emergency message may be transmitted at one period of a transmit power of a high level, a transmit power of a low level, and the transmit power of the low level, for example, by a strong-weak-weak-strong-weak-weak pattern.

According to various embodiments of the present disclosure, the predicted transmit power level or the real transmit power level may be determined according to, for example, a transmit current level for transmitting the emergency message, which is first determined by the transmission control module 360. Therefore, the above-described elements for determining the transmit power level may be used to determine the transmit current level.

The transmission control module 360 may update a transmit power level by a user input or at predetermined periods. In addition, the transmission control module 360 may update a predetermined transmission period of the emergency message and the number of times the emergency message is transmitted, according to the transmit power level.

When there is another electronic device which transmits the emergency message in addition to the first electronic device 210, the first electronic device 210 may transmit the emergency message in cooperation with the other electronic device. For example, the first electronic device 210 may determine a transmission period of the emergency message twice as much as a predetermined value and may perform control such that the other electronic device transmits the emergency message at the same period. In this case, the first electronic device 210 and the other electronic device may alternately transmit the emergency message, thus obtaining the same effect that the first electronic device 210 transmits the emergency message at the predetermined periods.

The transmission control module 360 may end the transmission of the emergency message according to the acknowledgement message received by the reception module 330. Since the first electronic device 210 may communicate with the second electronic device 220 in a unicasting scheme, this is to reduce unnecessary battery consumption due to periodic transmission of the emergency message.

Herein, the transmission control module 360 may not end the transmission of the emergency message to transmit the emergency message to other electronic devices other than the second electronic device 220.

In addition, since the second electronic device 220 or a terminal of an ambulance, and the like, may not detect a position of the first electronic device 210, the transmission control module 360 may not end the transmission of the emergency message.

According to various embodiments of the present disclosure, the transmission control module 360 may design the emergency message such that the emergency message is available to an electronic device which departs from a predetermined distance. For example, when the user of the first electronic device 210 is abducted by an abductor, since the abductor may receive the emergency message, this is to prevent the emergency message from being received by the abductor. For example, the emergency message may include a message type for allowing another electronic device to determine availability of the emergency message according to a received signal strength indication (RSSI) for receiving the emergency message. Since an electronic device of the abductor is close to the first electronic device 210, the RSSI is strong. In this case, packets of the emergency message need to be configured such that the emergency message is not available to the second electronic device.

The processor (e.g., the processor 120 shown in FIG. 1) of the first electronic device 210 may limit at least one or more of functions of the first electronic device 210 to reduce the amount of the battery consumed by the first electronic device 210. For example, the processor may activate the transmission module 350 corresponding to BLE and may inactivate a transmission module corresponding to another network. In addition, the processor may inactivate a vibration motor or a display function of a screen.

The memory 370 may store at least one or more data by the processor. In this case, the data stored in the memory 370 may include data input and output between components in the first electronic device 210 and may include data input and output between components in the first electronic device 210 and components out of the first electronic device 210. For example, the memory 370 may store various information and the like collected by the information collection module 320. In addition, the memory 370 may store the emergency mode duration and the like set by the emergency mode setting module 340.

This memory 370 may include a hard disc drive, a read only memory (ROM), a random access memory (RAM), a flash memory, a memory card, and the like, which are present in or out of the first electronic device 210.

It should be well understood to those skilled in the art that the emergency mode activation module 310, the information collection module 320, the reception module 330, the emergency mode setting module 340, the transmission module 350, the transmission control module 360, and the memory 270 may be implemented to be independent of the first electronic device 210 or such that one or more thereof are integrated with each other.

According to various embodiments of the present disclosure, an electronic device may include an emergency mode activation module configured to activate an emergency mode, a transmission control module configured to determine a transmit power level based on a predetermined condition, and a transmission module configured to transmit an emergency message, including information associated with a request for rescue, with the determined transmit power level.

According to various embodiments of the present disclosure, the electronic device may further include an information collection module configured to collect state information obtained by the electronic device with respect to the electronic device or a user of the electronic device.

According to various embodiments of the present disclosure, the electronic device may further include a reception module configured to receive a session generation request from another electronic device which receives the transmitted emergency message.

According to various embodiments of the present disclosure, the electronic device may further include an emergency mode setting module configured to determine duration of the emergency mode. The transmission control module may determine a transmit power level based on the duration of the emergency mode.

Figure 3B:
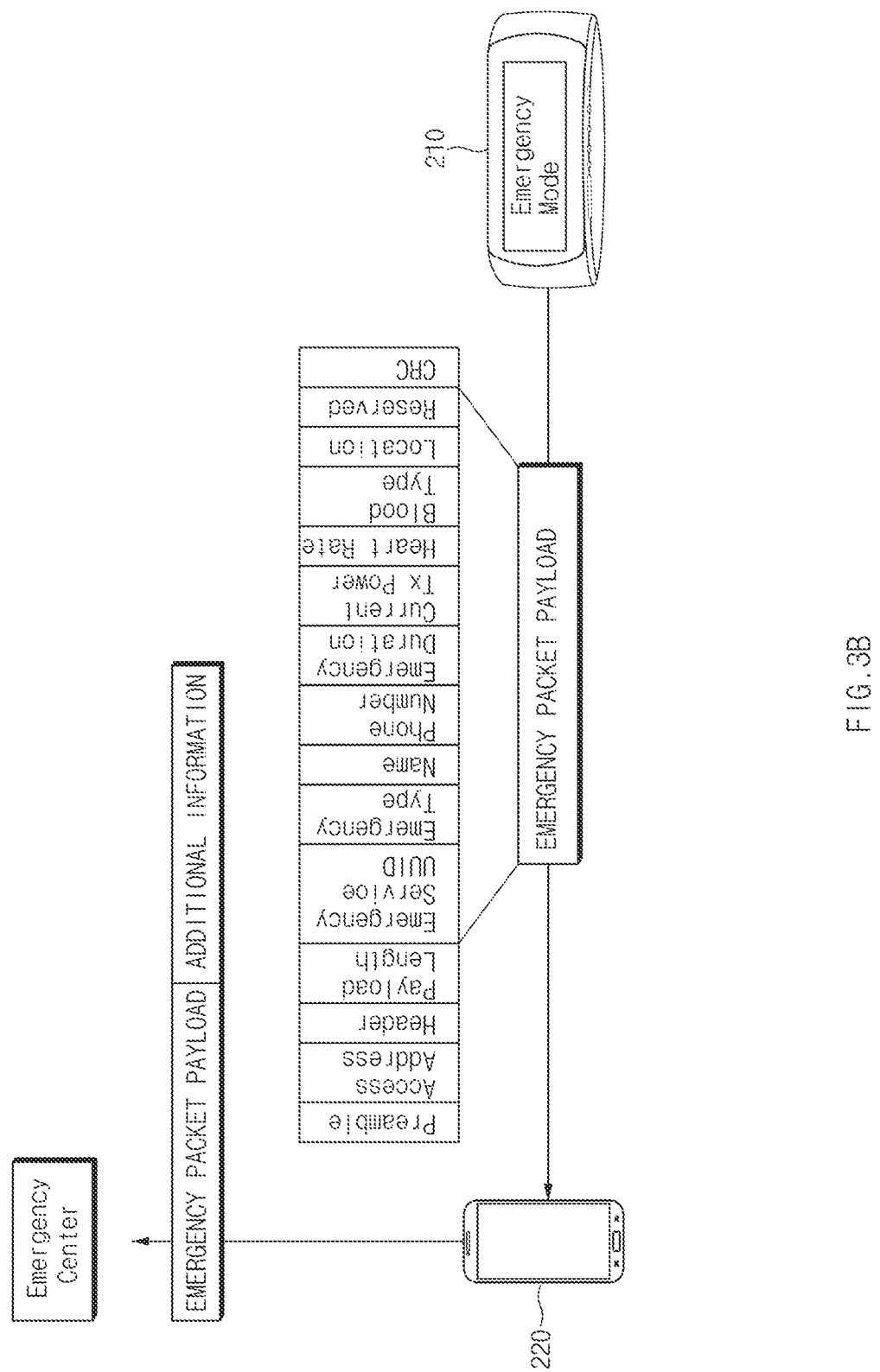
FIG. 3B illustrates a configuration of an emergency message and a configuration of a message transmitted from an electronic device, which receives the emergency message, to an outside according to various embodiments of the present disclosure.

FIG. 3B illustrates a configuration of an emergency message and a configuration of a message transmitted from an electronic device, which receives the emergency message, to an outside according to various embodiments of the present disclosure.

Referring to FIG. 3B, the emergency message may be a text message or may have a predetermined message type. When the emergency message is the text message, a second electronic 220 may display the text message on its screen. In this case, the second electronic device 220 may transmit an acknowledgement message (or a session connection request message) to the emergency message to a first electronic device 210 of FIG. 2 by a user of the second electronic device 220. Herein, hereinafter, it is assumed that the emergency message has the predetermined message type in FIG. 3B.

Referring to FIG. 3B, the first electronic device 210 may transmit an emergency message to the second electronic device 220. The emergency message may include header information and payload information. The payload information of the emergency message may include type information indicating an emergency, information about a name, a phone number, a blood type, and a medical history of a user, position information of the first electronic device 210, and information about an emergency mode entrance time. In addition, the payload information of the emergency message may further include state information, such as activity information (e.g., information about whether a user is walking, running, driving, and the like) and heart rate information of the user.

According to various embodiments of the present disclosure, the emergency message may include a message type for allowing another electronic device (e.g., the second electronic device 220) to determine availability of the emergency message according to an RSSI for receiving the emergency message.

The second electronic device 220 may transmit a message, including at least a part of information included in the emergency message and the state information, to the outside, for example, an emergency center. The message may further include position information of the second electronic device 220, information about time when the second electronic device 220 receives the emergency message, and the like.

Figure 4:
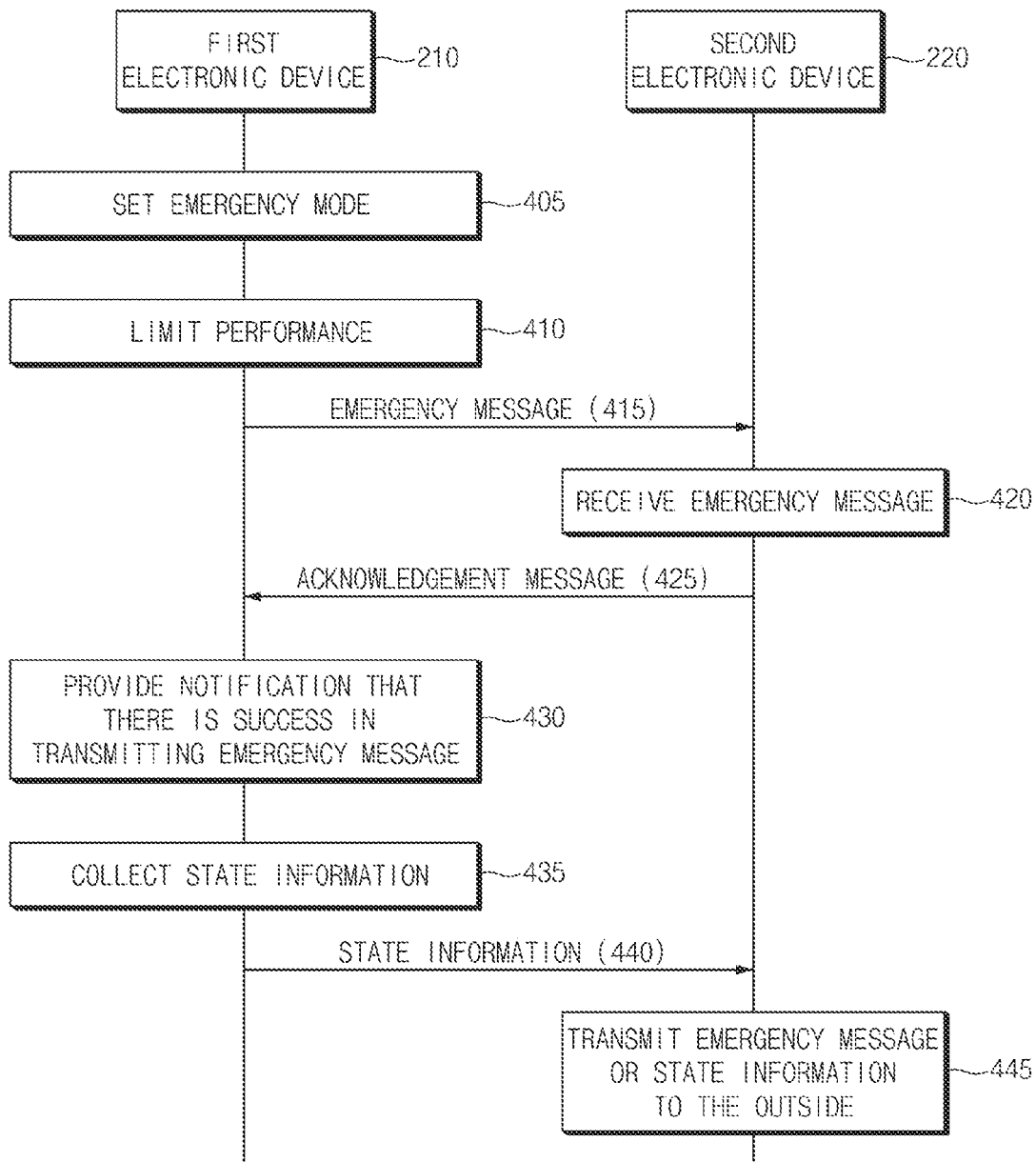
FIG. 4 is a signal sequence diagram illustrating a method for transmitting an emergency message according to various embodiments of the present disclosure.

FIG. 4 is a signal sequence diagram illustrating a method for transmitting an emergency message according to various embodiments of the present disclosure.

Referring to FIG. 4, the method for transmitting the emergency message according to an embodiment of the present disclosure may include operations processed in time series in a first electronic device 210 and a second electronic device 220 according to an embodiment of the present disclosure shown in FIGS. 1 to 3B. Therefore, although there are omitted contents below, contents described about the first electronic device 210 and the second electronic device 220 of FIGS. 1 to 3B may be applied to the method for transmitting the emergency message according to the embodiment of the present disclosure shown in FIG. 4.

In operation 405, the first electronic device 210 may activate an emergency mode in various ways. For example, the first electronic device 210 may activate the emergency mode according to a user input, a message (e.g., disaster information, and the like) for informing an emergency, or state information of the first electronic device 210.

In operation 410, the first electronic device 210 may limit at least a part of various functions of the first electronic device 210 according to the activation of the emergency mode. For example, the first electronic device 210 may activate only a communication module corresponding to BLE among communication modules.

In operation 415, the first electronic device 210 may transmits an emergency message to the second electronic device 220. Herein, the first electronic device 210 may not designate the second electronic device 220 as a transmission target of the emergency message. For example, the first electronic device 210 may broadcast the emergency message without designating a reception device, using BLE. In this case, it is assumed that an electronic device which receives the emergency message is the second electronic device 220.

In operation 420, the second electronic device 220 may receive the emergency message transmitted in operation 415. For example, the second electronic device 220 may receive the emergency message by scanning BLE.

In operation 425, the second electronic device 220 may transmit an acknowledgement message, for providing notification that the emergency message is received, to the first electronic device 210. The second electronic device 220 may transmit the acknowledgement message to the first electronic device 210 in a BLE broadcasting or unicasting scheme.

In operation 430, the first electronic device 210 may provide notification that there is success in transmitting the emergency message to the user, according to the acknowledgement message transmitted in operation 425.

In operation 435, the first electronic device 210 may collect state information about the user or the first electronic device 210 through at least one or more sensors.

In operation 440, the first electronic device 210 may transmit the state information collected in operation 435 to the second electronic device 220.

In operation 445, the second electronic device 220 may transmit at least some of the emergency message transmitted in operation 415 or the state information transmitted in operation 440 to the outside.

The order of operations 405 to 445 described above with reference to FIG. 4 is only an example and is not limited thereto. In other words, the order of the above-described operations may be changed to each other, and some thereof may be simultaneously performed. For example, the transmission of some of the information in operation 445 may be performed after operation 420.

The above-described operations may be periodically repeated at predetermined time intervals and may be performed again according to a user input. In addition, at least some of the above-described operations may be omitted. For example, operation 430 may be omitted to reduce the amount of a battery consumed by the first electronic device 210.

Figure 5:
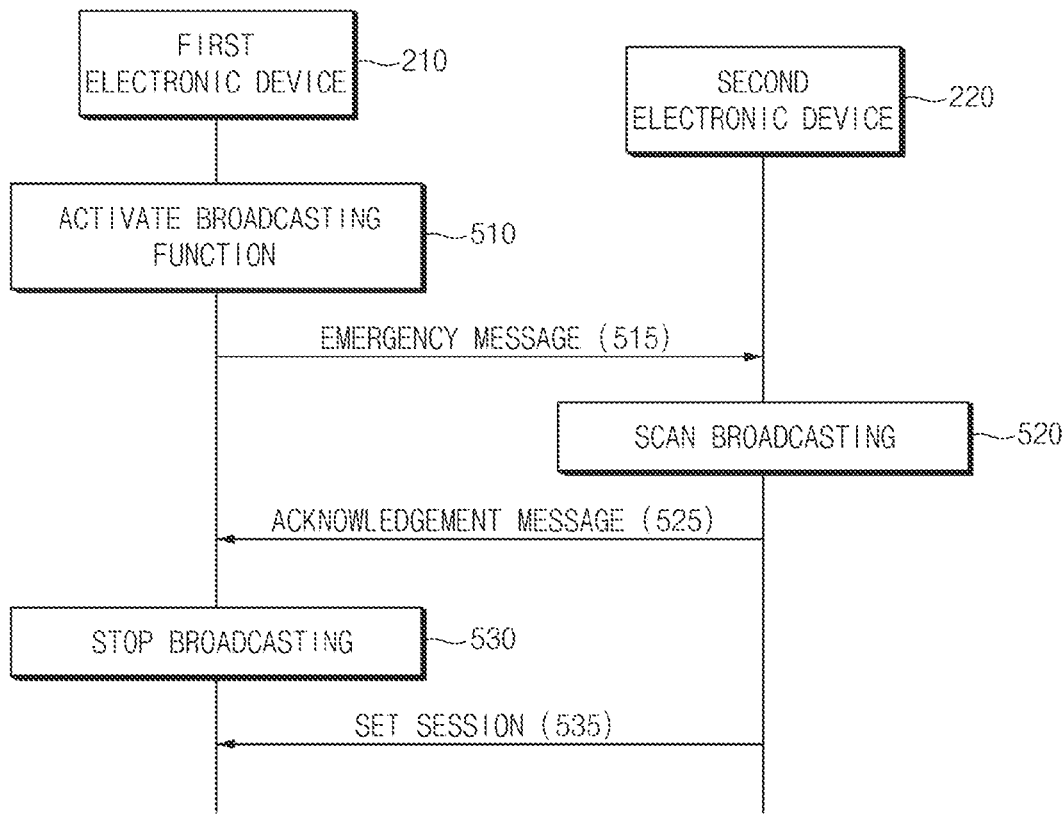
FIG. 5 is a signal sequence diagram illustrating a communication method between a first electronic device and a second electronic device according to various embodiments of the present disclosure.

FIG. 5 is a signal sequence diagram illustrating a communication method between a first electronic device and a second electronic device according to various embodiments of the present disclosure.

Referring to FIG. 5, the communication method between the first electronic device 210 and the second electronic device 220 according to an embodiment of the present disclosure may include operations processed in time series in the first electronic device 210 and the second electronic device 220 according to an embodiment of the present disclosure shown in FIGS. 1 to 4. Therefore, although there are omitted contents below, contents described about the first electronic device 210 and the second electronic device 220 of FIGS. 1 to 4 may be applied to the communication method between the first electronic device 210 and the second electronic device 220 according to the embodiment of the present disclosure shown in FIG. 5.

In operation 510, the first electronic device 210 may activate a broadcasting function. In this case, the activated broadcasting function may be using a BLE network.

In operation 515, the first electronic device 210 may transmit an emergency message to the second electronic device 220 using the broadcasting function activated in operation 510. As described above, the first electronic device 210 may transmit the emergency message in a random way around the first electronic device 210 without designating a target to be transmitted.

In operation 520, the second electronic device 220 may receive the emergency message transmitted in operation 515 by scanning broadcasting. The second electronic device 220 may scan the broadcasting using the BLE network in the same manner as that of operation 510.

In operation 525, the second electronic device 220 may transmit an acknowledgement message to the emergency message transmitted in operation 515 to the first electronic device 210.

In operation 530, the first electronic device 210 may stop the broadcasting function activated in operation 510.

In operation 535, the first electronic device 210 and the second electronic device 220 may set a session therebetween. The set session may be for transmitting and receiving a message or for incoming and outgoing calls.

The order of operations 505 to 535 described above with reference to FIG. 5 is only an example and is not limited thereto. In other words, the order of the above-described operations may be changed to each other, and some thereof may be simultaneously performed. In addition, the above-described operations may be periodically repeated at predetermined time intervals and may be performed again according to a user input.

Figure 6:
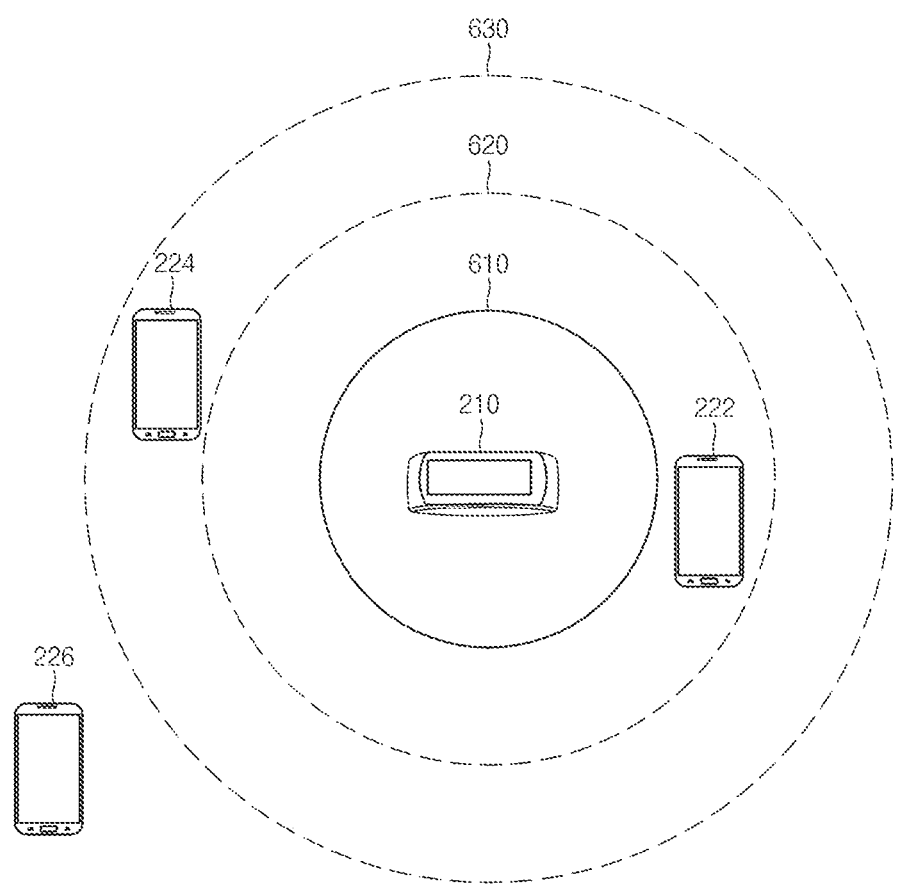
FIG. 6 illustrates a method for performing communication between an electronic device and other electronic devices according to various embodiments of the present disclosure.

FIG. 6 illustrates a method for performing communication between an electronic device and other electronic devices according to various embodiments of the present disclosure.

Referring to FIG. 6, a first electronic device 210 communicates with other electronic devices 222 to 226 according to various embodiments of the present disclosure. FIG. 6 illustrates the first electronic device 210 and the other electronic devices 222 to 226. In addition, each of concentric circles which encircle the first electronic device 210 refer to corresponding one of communication ranges 610 to 630 according to transmit power levels of the first electronic device 210.

Referring to FIG. 6, when the transmit power level of the first electronic device 210 is a first level, the first electronic device 210 may transmit an emergency message within the communication range 610. Herein, since there are no other electronic devices 222 to 226 within the communication range 610, the emergency message may not reach the other electronic devices 222 to 226.

When the transmit power level of the first electronic device 210 is a second level, the first electronic device 210 may transmit an emergency message within the communication range 620. Referring to FIG. 6, since the other electronic device 222 is present within the communication range 620, the emergency message may reach the other electronic device 222. Herein, for the other electronic device 22 to receive the emergency message, the other electronic device 222 may should be able to use a network protocol to be shared with the first electronic device 210.

When the transmit power level of the first electronic device 210 is a third level, the first electronic device 210 may transmit an emergency message within the communication range 630. Referring to FIG. 6, since the other electronic devices 222 and 224 are present within the communication range 630, the emergency message may reach the other electronic devices 222 and 224.

According to various embodiments of the present disclosure, the first electronic device 210 may designate a range in which the emergency message is available to the other electronic devices 222 to 226. For example, although the transmit power level of the first electronic device 210 is the third level, the first electronic device 210 may limit a range within the communication range 620. In this case, the emergency message may be valid in the other electronic device 224, but may not be valid in the other electronic device 222.

Since the other electronic device 226 is not included within the communication range 630, the other electronic device 226 may receive the emergency message when the transmit power level of the first electronic device 210 is higher than the third level.

Each of the communication ranges 610 to 630 of the first electronic device 210, which is shown in FIG. 6, is spaced for each transmit power level of the first electronic device 210. However, according to various embodiments of the present disclosure, the communication range of the first electronic device 210 may be expanded or reduced in a linear way according to a linear increase and decrease of the transmit power level of the first electronic device 210.

Figure 7:
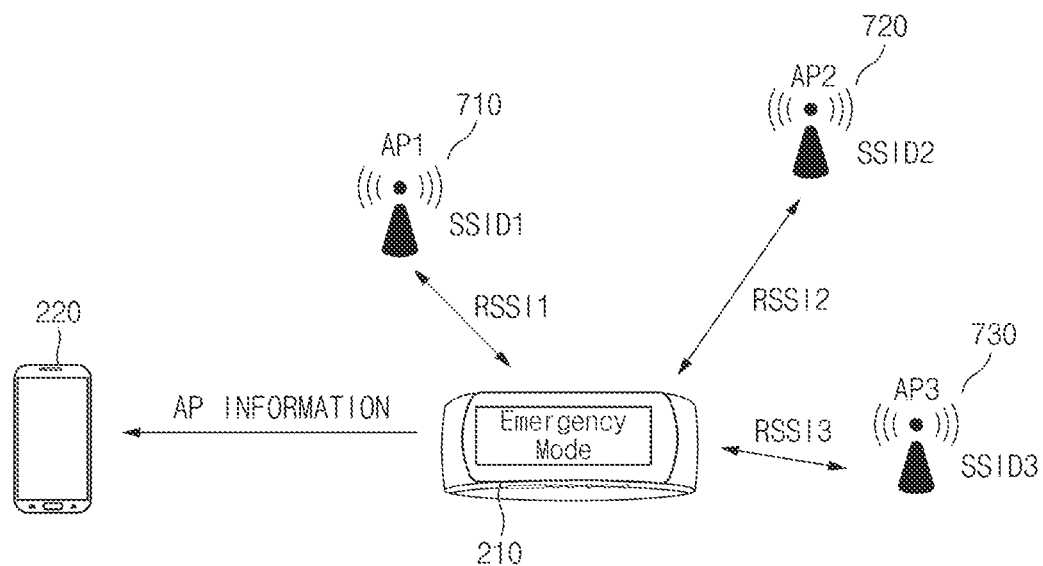
FIG. 7 illustrates a method for measuring a position of an electronic device according to various embodiments of the present disclosure.

FIG. 7 illustrates a method for measuring a position of an electronic device according to various embodiments of the present disclosure.

Referring to FIG. 7, the first electronic device 210 may communicate with a first access point (AP) 710, a second AP 720, and a third AP 730.

For example, the first electronic device 210 may scan APs around the first electronic device 210. The first electronic device 210 may obtain identification information of each of the corresponding APs 710 to 730, for example, a service set identifier 1 (SSID1), an SSID2, and an SSID3. In addition, the first electronic device 210 may measure RSSI information about each of the scanned APs 710 to 730 and position information of each of the APs 710 to 730.

The second electronic device 220 may receive the RSSI information about each of the APs 710 to 730 and the position information about each of the APs 710 to 730 for the first electronic device 210. In this case, the second electronic device 220 may detect a position of the first electronic device 210 using the received RSSI information and the received position information, for example, in a triangulation scheme.

According to various embodiments of the present disclosure, the first electronic device 210 may directly measure its position using a measured RSSI and may transmit the measured position to the second electronic device 220.

Referring to FIG. 7, for example, only three APs are shown according to various embodiments of the present disclosure.

However, referring to FIG. 7, APs necessary for measuring the position of the first electronic device 210 may not limited to the three APs. For example, the position of the first electronic device 210 may be measured using four or more APs. In addition, the APs 710 to 730 shown in FIG. 7 may include a GPS satellite.

Figure 8:
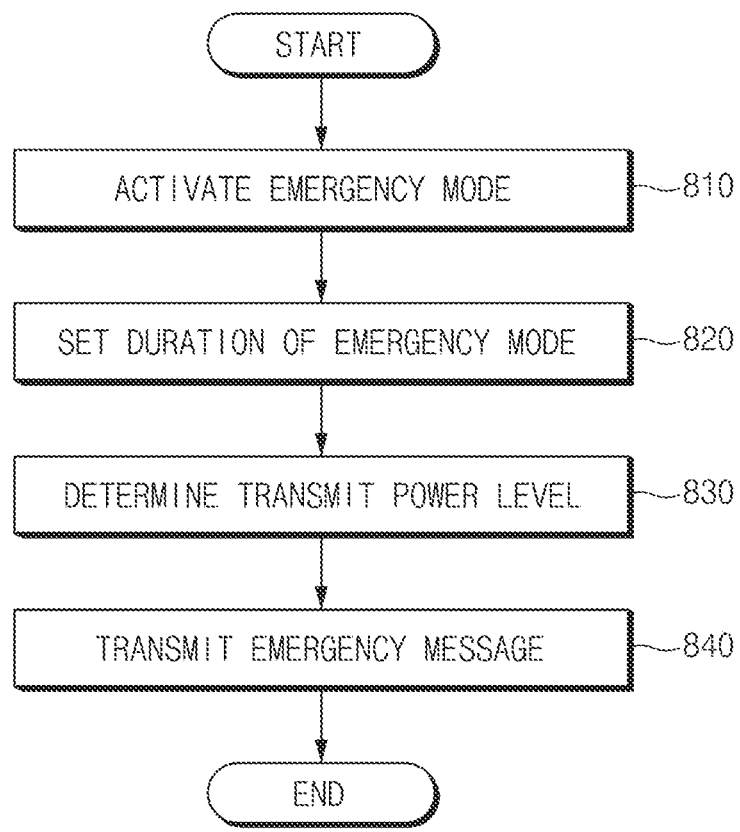
FIG. 8 is a flowchart illustrating a method for determining a transmit power level according to various embodiments of the present disclosure.

FIG. 8 is a flowchart illustrating a method for determining a transmit power level according to various embodiments of the present disclosure.

Referring to FIG. 8, the method for determining the transmit power level according to an embodiment of the present disclosure may include operations processed in time series in a first electronic device 210 according to an embodiment of the present disclosure shown in FIGS. 1 to 7. Therefore, although there are omitted contents below, contents described about the first electronic device 210 of FIGS. 1 to 7 may be applied to the method for determining the transmit power level according to the embodiment of the present disclosure shown in FIG. 8.

In operation 810, the first electronic device 210 may activate its emergency mode according to various conditions.

In operation 820, the first electronic device 210 may set duration of the emergency mode activated in operation 810. According to various embodiments of the present disclosure, the first electronic device 210 may receive duration of an emergency mode from a user. In addition, the first electronic device 210 may use predetermined duration of an emergency mode, as a default setting, without change.

In operation 830, the first electronic device 210 may determine a transmit power level of its transmission module. For example, the first electronic device 210 may determine the transmit power level of the transmission module according to the duration set in operation 820.

In operation 840, the first electronic device 210 may transmit an emergency message. The first electronic device 210 may transmit the emergency message within a range corresponding to the transmit power level determined in operation 830. In this case, the emergency message may be transmitted in a broadcasting scheme.

The order of operations 810 to 840 described above with reference to FIG. 8 is only an example and is not limited thereto. In other words, the order of the above-described operations may be changed to each other, and some thereof may be simultaneously performed. For example, operation 810 may be performed after operations 820 and 830 are performed.

In addition, the above-described operations may be periodically repeated at predetermined time intervals and may be performed again according to a user input.

According to various embodiments of the present disclosure, a method for determining a transmit power level in an electronic device may include activating an emergency mode, determining a transmit power level based on a predetermined condition, and transmitting an emergency message, including information associated with a request for rescue, with the determined transmit power level.

According to various embodiments of the present disclosure, the method may further include collecting state information obtained by the electronic device with respect to the electronic device or a user of the electronic device.

According to various embodiments of the present disclosure, the state information may include at least one or more of position information of the electronic device, motion information including position change information and acceleration change information of the electronic device, a time point when the emergency mode is activated, and bio-information including a heart rate and $SpO_2$ of the user.

According to various embodiments of the present disclosure, the method may further include receiving a session generation request from another electronic device which receives the transmitted emergency message and generating a session with the other electronic device. For example, the method may further include transmitting state information to the other electronic device through the generated session.

According to various embodiments of the present disclosure, the information associated with the request for rescue may be a text message or may have a predetermined message type.

According to various embodiments of the present disclosure, the emergency message may further include information of the electronic device or user information of the electronic device. For example, the information of the electronic device may include at least one or more of a phone number and identification information. The user information of the electronic device may include at least one or more of previous input information about a name, a blood type, and a medical history of the user.

According to various embodiments of the present disclosure, at least some of information included in the transmitted emergency message and the state information may be transmitted to the outside through the other electronic device.

According to various embodiments of the present disclosure, the transmitting of the emergency message may be performed in a broadcasting scheme.

According to various embodiments of the present disclosure, the method may further include ending the transmission of the emergency message or adjusting the transmit power level, according to the reception of the session generation request.

According to various embodiments of the present disclosure, the activating of the emergency mode may be performed according to a user input for activating the emergency mode, state information, or a message, for informing an emergency, received from the outside.

According to various embodiments of the present disclosure, the determining of the transmit power level may be performed based on duration of the emergency mode.

According to various embodiments of the present disclosure, the method may further include determining the remaining capacity of a battery of the electronic device. The determining of the transmit power level may be performed based on the determined remaining capacity of the battery.

According to various embodiments of the present disclosure, the determining of the transmit power level may be performed based on a transmission period of the emergency message or a transmission range of the emergency message.

According to various embodiments of the present disclosure, the determining of the transmit power level may be performed based on a level of power consumed by a function activated by the electronic device.

According to various embodiments of the present disclosure, the method may further include inactivating at least a part of functions of the electronic device according to the activation of the emergency mode.

According to various embodiments of the present disclosure, the emergency message may include a message type for allowing another electronic device to determine availability of the emergency message according to an RSSI for receiving the emergency message.

Figure 9:
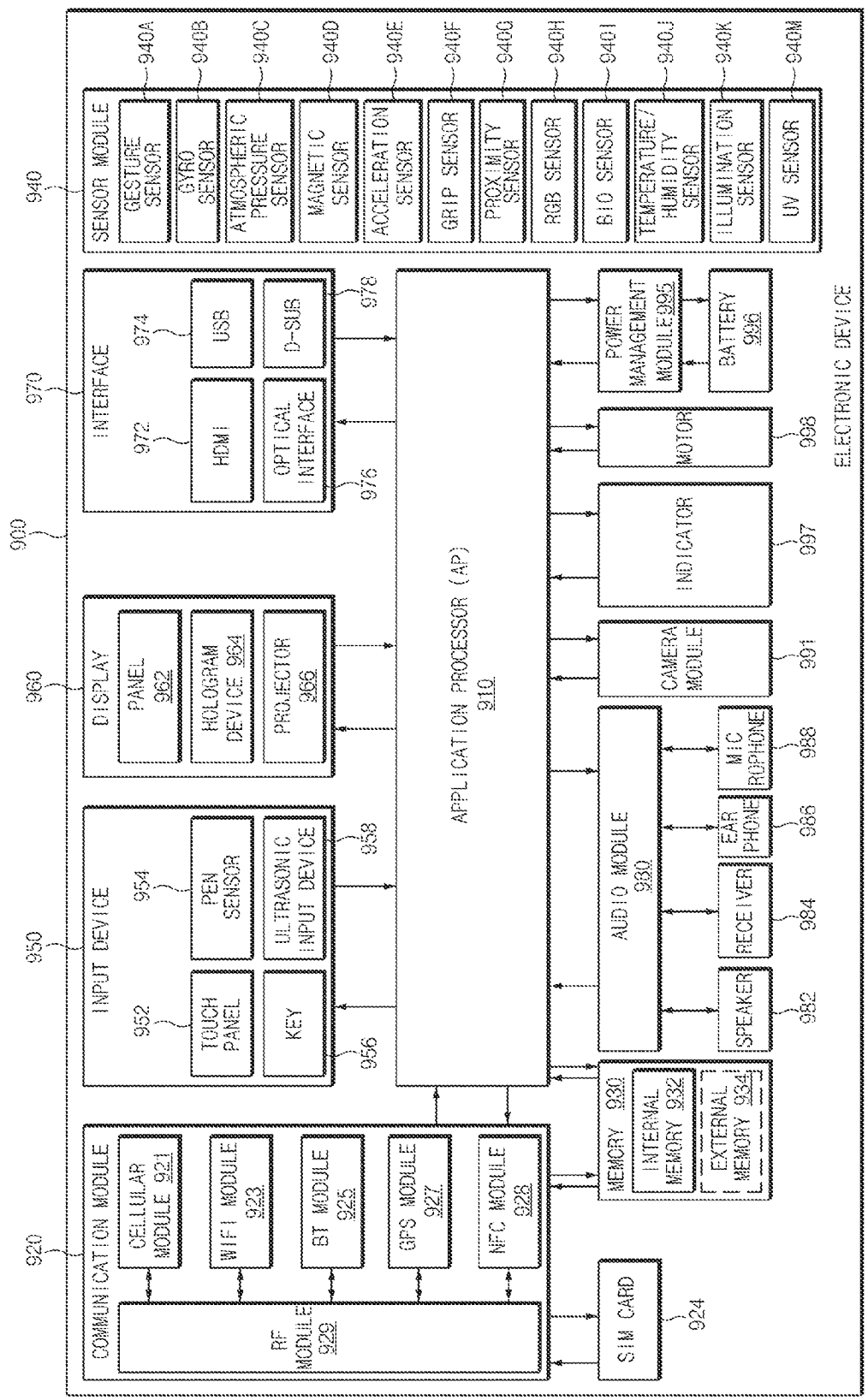
FIG. 9 is a block diagram illustrating a configuration of an electronic device according to various embodiments of the present disclosure.

FIG. 9 is a block diagram illustrating a configuration of an electronic device according to various embodiments of the present disclosure.

Referring to FIG. 9, an electronic device 900, which may include, for example, all or a part of an electronic device 101 shown in FIG. 1, may include one or more APs 910, a communication module 920, a subscriber identification module (SIM) card 924, a memory 930, a sensor module 940, an input device 950, a display 960, an interface 970, an audio module 980, a camera module 991, a power management module 995, a battery 996, an indicator 997, and a motor 998.

The AP 910 may drive an operating system (OS) or an application program to control a plurality of hardware or software components connected thereto and may process and compute a variety of data including multimedia data. The AP 910 may be implemented with, for example, a system on chip (SoC). According to an embodiment of the present disclosure, the AP 910 may further include a graphical processing unit (GPU) (not shown).

The communication module 920 (e.g., a communication interface 160 of FIG. 1) may transmit and receive data in communication between the electronic device 900 (e.g., the electronic device 101) and another electronic device (e.g., the other electronic device 104 or the server 106 of FIG. 1) connected with the electronic device 900 through a network. According to an embodiment of the present disclosure, the communication module 920 may include a cellular module 921, a Wi-Fi module 923, a BT module 925, a GPS module 927, an NFC module 928, and an RF module 929.

The cellular module 921 may provide a voice call service, a video call service, a text message service, an Internet service, and the like, through a communication network (e.g., LTE, LTE-A, CDMA, WCDMA, UMTS, WiBro, or GSM, and the like)). In addition, the cellular module 921 may identify and authenticate the electronic device 900 within a communication network using a SIM (e.g., the SIM card 924). According to an embodiment of the present disclosure, the cellular module 921 may perform at least a part of functions which may be provided by the AP 910. For example, the cellular module 921 may perform at least a part of a multimedia control function.

According to an embodiment of the present disclosure, the cellular module 921 may include a communication processor (CP). In addition, the cellular module 921 may be implemented with, for example, an SoC. FIG. 9 illustrates an example in which components, such as the cellular module 921 (e.g., the CP), the memory 930, or the power management module 995 are independent of the AP 910. However, according to an embodiment of the present disclosure, the AP 910 may be implemented to include at least a part (e.g., the cellular module 921) of the above-described components.

According to an embodiment of the present disclosure, the AP 910 or the cellular module 921 (e.g., the CP) may load instructions or data received from at least one of non-volatile memories or other components, which connect thereto, into a volatile memory to process the instructions or the data. In addition, the AP 910 or the cellular module 921 may store data, which are received from at least one of other components or are generated by at least one of the other components, in a non-volatile memory.

The Wi-Fi module 923, the BT module 925, the GPS module 927, or the NFC module 928 may include, for example, a processor for processing data transmitted and received through the corresponding module. FIG. 9 illustrates an example in which the cellular module 921, the Wi-Fi module 923, the BT module 925, the GPS module 927, or the NFC module 928 is independent of each other. However, according to an embodiment of the present disclosure, at least a part (e.g., two or more) of the cellular module 921, the Wi-Fi module 923, the BT module 925, the GPS module 927, or the NFC module 928 may be included in one integrated chip (IC) or an IC package. For example, at least a part (e.g., a CP corresponding to the cellular module 921 and a Wi-Fi processor corresponding to the Wi-Fi module 923) of the cellular module 921, the Wi-Fi module 923, the BT module 925, the GPS module 927, or the NFC module 928 may be implemented with one SoC.

The RF module 929 may transmit and receive data, for example, an RF signal. Though not shown, the RF module 929 may include, for example, a transceiver, a power amplifier module (PAM), a frequency filter, a low noise amplifier (LNA), and the like. In addition, the RF module 929 may further include components, for example, conductors or wires, and the like, for transmitting and receiving electromagnetic waves on a free space in wireless communication. FIG. 9 illustrates an example in which the cellular module 921, the Wi-Fi module 923, the BT module 925, the GPS module 927, or the NFC module 928 shares the one RF module 929 with each other. However, according to an embodiment of the present disclosure, at least one of the cellular module 921, the Wi-Fi module 923, the BT module 925, the GPS module 927, or the NFC module 928 may transmit and receive an RF signal through a separate RF module.

The SIM card 924 may be a card which includes a SIM and may be inserted into a slot formed in a specific position of the electronic device 900. The SIM card 924 may include unique identification information (e.g., an integrated circuit card identifier (ICCID)) or subscriber information (e.g., an international mobile subscriber identity (IMSI)).

The memory 930 (e.g., a memory 130 of FIG. 1) may include an embedded memory 932 or an external memory 934. The embedded memory 932 may include at least one of, for example, a volatile memory (e.g., a dynamic RAM (DRAM), a static RAM (SRAM), or a synchronous DRAM (SDRAM), and the like), or a non-volatile memory (e.g., a one-time programmable ROM (OTPROM), a PROM, an erasable and programmable ROM (EPROM), an electrically erasable and programmable ROM (EEPROM), a mask ROM, a flash ROM, a NAND flash memory, a NOR flash memory, and the like).

According to an embodiment of the present disclosure, the embedded memory 932 may be a solid state drive (SSD). The external memory 934 may further include a flash drive, for example, a compact flash (CF), a secure digital (SD), a micro-SD, a mini-SD, an extreme digital (xD), a memory stick, and the like. The external memory 934 may functionally connect with the electronic device 900 through various interfaces. According to an embodiment of the present disclosure, the electronic device 900 may further include a storage device (or a storage medium), such as a hard drive.

The sensor module 940 may measure a physical quantity or may detect an operation state of the electronic device 900, and may convert the measured or detected information to an electric signal. The sensor module 940 may include at least one of, for example, a gesture sensor 940A, a gyro sensor 940B, an atmospheric pressure sensor 940C, a magnetic sensor 940D, an acceleration sensor 940E, a grip sensor 940F, a proximity sensor 940G, a color sensor 940H (e.g., a red, green, blue (RGB) sensor), a biosensor 940I, a temperature/humidity sensor 940J, an illumination sensor 940K, or an ultraviolet (UV) sensor 940M. Additionally or alternatively, the sensor module 940 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown). The sensor module 940 may further include a control circuit for controlling at least one or more sensors included therein.

The input device 950 may include a touch panel 952, a (digital) pen sensor 954, a key 956, or an ultrasonic input unit 958. The touch panel 952 may recognize a touch input in at least one of, for example, a capacitive type, a resistive type, an infrared type, and an ultrasonic type. In addition, the touch panel 952 may further include a control circuit. In case of the capacitive type, physical contact or proximity recognition is possible. The touch panel 952 may further include a tactile layer. In this case, the touch panel 952 may provide a tactile reaction to a user.

The (digital) pen sensor 954 may be implemented using, for example, the same or similar method as or to a method for receiving a touch input of the user or a separate sheet for recognition. The key 956 may include, for example, a physical button, an optical key, a keypad, and the like. The ultrasonic input unit 958 may be a device, which allows the electronic device 900 to detect a sound wave using a microphone (e.g., a microphone 988) and to determine data through an input tool which generates an ultrasonic signal. The ultrasonic input unit 958 may perform wireless recognition. According to an embodiment of the present disclosure, the electronic device 900 may receive a user input from an external device (e.g., a computer or a server) connected with the communication module 920, using the communication module 920.

The display 960 (e.g., a display 150 of FIG. 1) may include a panel 962, a hologram device 964, or a projector 966. The panel 962 may be, for example, a liquid-crystal display (LCD) or an active-matrix organic light-emitting diode (AM-OLED), and the like. The panel 962 may be implemented to be, for example, flexible, transparent, or wearable. The panel 962 and the touch panel 852 may be integrated into one module. The hologram device 964 may show a stereoscopic image in a space using interference of light. The projector 966 may project light onto a screen to display an image. The screen may be positioned, for example, inside or outside the electronic device 900. According to an embodiment of the present disclosure, the display 960 may further include a control circuit for controlling the panel 962, the hologram device 964, or the projector 966.

The interface 970 may include, for example, an HDMI 972, a USB 974, an optical interface 976, or a D-subminiature 978. The interface 970 may be included in, for example, a communication interface 160 shown in FIG. 1. Additionally or alternatively, the interface 970 may include, for example, a mobile high definition link (MHL) interface, an SD card/multimedia card (MMC) interface, or an infrared data association (IrDA) standard interface.

The audio module 980 may convert a sound and an electric signal in dual directions. At least a part of components of the audio module 980 may be included in, for example, an input and output interface 140 shown in FIG. 1. The audio module 980 may process sound information input or output through, for example, a speaker 982, a receiver 984, an earphone 986, the microphone 988, and the like.

The camera module 991 may be a device which captures a still picture and a moving picture. According to an embodiment of the present disclosure, the camera module 991 may include one or more image sensors (not shown) (e.g., a front sensor or a rear sensor), a lens (not shown), an image signal processor (ISP) (not shown), or a flash (not shown) (e.g., an LED or a xenon lamp).

The power management module 995 may manage power of the electronic device 900. Though not shown, the power management module 995 may include a power management IC (PMIC), a charger IC, or a battery or fuel gauge.

The PMIC may be mounted in an IC or an SoC semiconductor. A charging method may be classified as a wired charging method or a wireless charging method. The charging IC may charge the battery 996 and may prevent overvoltage or overcurrent from flowing in from a charger. According to an embodiment of the present disclosure, the charging IC may include a charging IC for at least one of the wired charging method or the wireless charging method. The wireless charging method may be, for example, a magnetic resonance method, a magnetic induction method, an electromagnetic method, and the like. An additional circuit for wireless charging, for example, a circuit, such as a coil loop, a resonance circuit, a rectifier, and the like, may be further provided.

The battery gauge may measure, for example, the remaining capacity of the battery 996 and voltage, current, or temperature thereof while the battery 996 is charged. The battery 996 may store or generate electricity and may supply power to the electronic device 900 using the stored or generated electricity. The battery 996 may include, for example, a rechargeable battery or a solar battery.

The indicator 997 may display a specific state of the electronic device 900 or a part (e.g., the AP 910) thereof, for example, a booting state, a message state, a charging state, and the like. The motor 998 may convert an electric signal into mechanical vibration. Though not shown, the electronic device 900 may include a processing unit (e.g., a GPU) for supporting a mobile TV. The processing unit for supporting the mobile TV may process media data according to the standard of, for example, digital multimedia broadcasting (DMB), digital video broadcasting (DVB), media flow, and the like.

According to various embodiments of the present disclosure, the electronic device may adjust a geographical range which may communicate with another electronic device by adjusting the transmit power level of the communication module of the electronic device, thus promoting user convenience.

Each of the above-mentioned elements of the electronic device according to various embodiments of the present disclosure may be configured with one or more components, and names of the corresponding elements may be changed according to the type of the electronic device. According to various embodiments of the present disclosure, the electronic device may be configured to include at least one of the above-mentioned elements, some elements may be omitted from the electronic device, or other additional elements may be further included in the electronic device. In addition, some of the elements of the electronic device according to various embodiments of the present disclosure may be combined with each other to form one entity, thus making it possible to perform the functions of the corresponding elements in the same manner as before the combination.

The terminology "module" used in various embodiments of the present disclosure may mean, for example, a unit including one of hardware, software, and firmware or two or more combinations thereof. The terminology "module" may be interchangeably used with, for example, terminologies "unit", "logic", "logical block", "component", "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific IC (ASIC) chip, field-programmable gate arrays (FPGAs), or a programmable-logic device, which is well known or will be developed in the future, for performing certain operations.

According to various embodiments of the present disclosure, at least a part of a device (e.g., modules or the functions) or a method (e.g., operations) may be implemented with, for example, instructions stored in a computer-readable storage media which has a program module. When the instructions are executed by one or more processors (e.g., the processor 120 of FIG. 1), the one or more processors may perform functions corresponding to the instructions. The computer-readable storage media may be, for example, the memory 130 of FIG. 1. At least a part of the programming module may be implemented (e.g., executed) by, for example, the processor 120. At least a part of the programming module may include, for example, a module, a program, a routine, sets of instructions, a process, and the like, for performing one or more functions.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Modules or program modules according to various embodiments of the present disclosure may include at least one or more of the above-mentioned components, some of the above-mentioned components may be omitted, or other additional components may be further included therein. Operations executed by modules, program modules, or other elements may be executed by a successive method, a parallel method, a repeated method, or a heuristic method. In addition, some of the operations may be executed in a different order or may be omitted, and other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for determining a transmit power level of an electronic device, the method comprising:
    activating an emergency mode;
    determining a transmit power level based on a predetermined condition including a transmission period of an emergency message and a duration of the emergency mode;
    configuring an emergency message; and
    transmitting the emergency message, including information associated with a request for rescue, with the determined transmit power level according to the predetermined condition; and
    inactivating at least a part of functions of the electronic device according to the activation of the emergency mode.

2. The method of claim 1, further comprising:
    collecting state information obtained by the electronic device with respect to the electronic device or a user of the electronic device.

3. The method of claim 2,
    wherein the state information comprises at least one of position information of the electronic device, motion information including position change information and acceleration change information of the electronic device, a time point when the emergency mode is activated, or bio-information including a heart rate and blood oxygen saturation of the user, and
    wherein the blood oxygen saturation comprises saturation of peripheral oxygen ($SpO_2$).

4. The method of claim 1, further comprising:
    receiving a session generation request from another electronic device which receives the transmitted emergency message; and
    generating a session with the other electronic device.

5. The method of claim 4, further comprising:
    transmitting state information to the other electronic device through the generated session.

6. The method of claim 1, wherein the information associated with the request for rescue comprises a text message or has a message type.

7. The method of claim 1, wherein the emergency message further comprises information on the electronic device or user information of the electronic device.

8. The method of claim 7,
wherein the information on the electronic device comprises at least one of a phone number or identification information, and
wherein the user information of the electronic device comprises at least one of information about a name, a blood type, or a medical history of the user which are previously input.

9. The method of claim 5, wherein at least some of information included in the transmitted emergency message and the transmitted state information is transmitted to a networked node or a server through the other electronic device.

10. The method of claim 1, wherein the transmitting of the emergency message is performed in a broadcasting scheme.

11. The method of claim 4, further comprising:
stopping the transmission of the emergency message or adjusting the transmit power level, according to the reception of the session generation request.

12. The method of claim 1, wherein the activating of the emergency mode is performed according to a user input for activating the emergency mode, state information, or a message, for notifying an emergency, received from a network node or a server.

13. The method of claim 1, wherein the determining of the transmit power level is performed based on activation duration of the emergency mode.

14. The method of claim 1, further comprising:
determining the remaining capacity of a battery of the electronic device,
wherein the determining of the transmit power level is performed based on the determined remaining capacity of the battery.

15. The method of claim 1, wherein the determining of the transmit power level is performed based on a transmission period of the emergency message of the emergency message.

16. The method of claim 1, wherein the determining of the transmit power level is performed based on a level of power consumed based on at least one function activated in the electronic device.

17. The method of claim 1, wherein the emergency message comprises a message type for allowing another electronic device to determine availability of the emergency message according to a received signal strength indication (RSSI) for receiving the emergency message.

18. An electronic device comprising:
at least one processor configured to:
activate an emergency mode,
determine a transmit power level based on a predetermined condition including a transmission period of an emergency message and a duration of the emergency mode, and
configure an emergency message; and
a transceiver configured to transmit the emergency message, including information associated with a request for rescue, with the determined transmit power level according to the predetermined condition,
wherein the at least one processor is further configured to inactivate at least a part of functions of the electronic device according to the activation of the emergency mode.

19. The electronic device of claim 18, further comprising:
a memory coupled to the at least one processor,
wherein the memory is configured to collect state information obtained by the electronic device with respect to the electronic device or a user of the electronic device.

20. The electronic device of claim 18,
wherein the transceiver is further configured to receive a session generation request from another electronic device which receives the transmitted emergency message.

21. At least one non-transitory computer readable storage medium for storing a computer program of instructions configured to be readable by at least one processor for instructing the at least one processor to execute a computer process for performing the method of claim 1.

* * * * *